(12) United States Patent
Takano et al.

(10) Patent No.: US 11,668,881 B2
(45) Date of Patent: Jun. 6, 2023

(54) CLEANING STICK GUIDE

(71) Applicant: Senko Advanced Components, Inc., Marlborough, MA (US)

(72) Inventors: Kazuyoshi Takano, Tokyo (JP); Kenji Iizumi, Tokyo (JP)

(73) Assignee: Senko Advanced Components, Inc., Hudson (MA)

( * ) Notice: Subject to any disclaimer, the term of this patent is extended or adjusted under 35 U.S.C. 154(b) by 322 days.

(21) Appl. No.: 17/024,856

(22) Filed: Sep. 18, 2020

(65) Prior Publication Data
US 2021/0080659 A1 Mar. 18, 2021

Related U.S. Application Data

(60) Provisional application No. 62/902,054, filed on Sep. 18, 2019, provisional application No. 62/926,639, filed on Oct. 28, 2019.

(51) Int. Cl.
*G02B 6/38* (2006.01)
*B08B 1/00* (2006.01)

(52) U.S. Cl.
CPC .............. *G02B 6/3866* (2013.01); *B08B 1/00* (2013.01); *B08B 2240/02* (2013.01)

(58) Field of Classification Search
CPC ...... G02B 6/3866; B08B 1/00; B08B 2240/02
See application file for complete search history.

(56) References Cited

U.S. PATENT DOCUMENTS

| | | | | |
|---|---|---|---|---|
| 6,047,716 | A * | 4/2000 | Shimoji | G02B 6/3897 134/201 |
| 7,089,624 | B2 * | 8/2006 | Malevants | B08B 1/008 15/345 |
| D623,369 | S * | 9/2010 | Sugita | D8/51 |
| 10,133,010 | B2 * | 11/2018 | Collier | G02B 6/3849 |
| 2005/0286853 | A1 * | 12/2005 | Fujiwara | B08B 1/008 385/134 |
| 2010/0199477 | A1 * | 8/2010 | Mercado | G02B 6/3849 29/280 |
| 2011/0047731 | A1 * | 3/2011 | Sugita | G02B 6/3807 15/97.1 |
| 2019/0346630 | A1 * | 11/2019 | Yang | G02B 6/3849 |
| 2020/0070211 | A1 * | 3/2020 | Brown | B08B 3/04 |
| 2021/0088731 | A1 * | 3/2021 | Takano | B08B 7/0028 |

FOREIGN PATENT DOCUMENTS

| | | | | |
|---|---|---|---|---|
| JP | 6771050 B2 | * 10/2020 | ............ | B08B 1/001 |
| WO | WO-2019040385 A1 | * 2/2019 | ............... | B08B 1/00 |

* cited by examiner

*Primary Examiner* — Daniel Petkovsek

(57) ABSTRACT

A cleaning stick guide for an optical housing having ferrules therein. The cleaning stick guide includes a guide housing having a proximal end and a distal end. The guide housing includes an insert portion sized and shaped to be inserted into the optical housing. The insert portion defines the distal end of the guide housing. The guide housing includes guide passageways. Each guide passageway extends from the proximal end to the distal end. Each guide passageway is arranged in the guide housing to align with one of the ferrules in the optical housing when the guide housing is inserted into the optical housing. Each guide passageway is sized and shaped to receive a cleaning stick and to guide the cleaning stick to said one ferrule for cleaning the ferrule.

16 Claims, 7 Drawing Sheets

CLEANING STICK GUIDE

CROSS-REFERENCE TO RELATED APPLICATION

This application claims priority to U.S. Provisional App. No. 62/902,054, filed Sep. 18, 2019, and U.S. Provisional App. No. 62/926,639, filed Oct. 28, 2019, the entirety of which is hereby incorporated by reference.

FIELD

The present disclosure generally relates to optical connectors and adapters, and, more specifically, to cleaning stick guide for optical connectors and adapters.

BACKGROUND

Optical connectors (e.g., fiber optic connectors) are used within optical communication networks to interconnect optical cables (e.g., optical fibers) to optical devices or other optical cables. Optical connectors typically include one or more ferrules attached to the end of the optical fibers. Each ferrule forms an optical interface or connection with another optical connector (e.g., a ferrule thereof). Each ferrule has a light transmissible endface that permits the transmission of light there through. For example, light can pass from the optical fiber, through the endface of the ferrule and to another optical connector and/or light can pass from the other optical connector, through the endface of the ferrule and into the optical fiber. Overtime, dust and other debris may enter the optical connector and cover or block the endface of the ferrule reducing or inhibiting the transmission of light to and/or from the ferrule. Periodic cleaning of the optical connector is performed in order to remove dust and other debris that may be covering or blocking the endface of the ferrule. Cleaning of the optical connector can be performed with a cleaning stick.

Conventional cleaning sticks for cleaning the endfaces of ferrules in optical connectors are shown in FIGS. 1 and 2. As shown in FIG. 1, a cleaning stick 1 has a handle 2 and a shaft 3 with a cleaning tip 4 (e.g., distal end portion) sized and shaped to be inserted into the housing 6 (e.g., port) of an optical adapter 5 (e.g., fiber optic adapter). The optical adapter 5 is secured to one or more optical connectors 10. The optical connectors 10 are attached to the end of optical cables. The cleaning tip includes a cleaning (e.g., distal) face 7 that has a cleaning medium thereon, such as a gel, tape, or any other suitable cleaning medium, that cleans the endface of the ferrule of the optical connector 10 when the distal end portion of the cleaning stick 1 is inserted into the housing 6 of the optical adapter 5. Various optical ferrules 8 are disclosed in FIG. 14. As shown in FIG. 2, the cleaning stick 1 can have a cleaning tip 4' of other sizes and shapes for cleaning other types and styles of optical adapters, such as the optical adapters described in U.S. Pat. No. 10,281,668, the entirety of which is hereby incorporated by reference. Generally, the cleaning tip 4, 4' of a cleaning stick 1 will be sized and shaped to fit a specific type or style of optical adapter 5 or optical connector 10.

SUMMARY

In one aspect, a cleaning stick guide for an optical housing having one or more ferrules therein comprises a guide housing having a proximal end and a distal end. The insert portion defines the distal end of the guide housing. The guide housing includes one or more guide passageways. Each guide passageway extends from the proximal end to the distal end. Each guide passageway is disposed in the guide housing to align with one ferrule of the one or more ferrules in the optical housing when the guide housing is inserted into the optical housing. Each guide passageway is sized and shaped to receive a cleaning stick and to guide the cleaning stick to said one ferrule for cleaning of said one ferrule.

In another aspect, an optical adapter assembly connects to one or more optical connectors. Each optical connector has one or more ferrules. The optical adapter assembly comprises an optical adapter having an adapter housing defining a port. The optical adapter is configured to couple to the one or more optical connectors such that the one or more ferrules are disposed in the adapter housing when the one or more optical connectors are coupled to the optical adapter. A cleaning stick guide has a proximal end and a distal end. The cleaning stick guide is sized and shaped to be inserted into the port of the optical adapter. The cleaning stick guide includes one or more guide passageways. Each guide passageway extends from the proximal end to the distal end. Each guide passageway is disposed in the cleaning stick guide to align with one ferrule of the one or more ferrules of the one or more optical connectors when the cleaning stick guide is disposed in the port of the optical adapter and the one or more optical connectors are coupled to the optical adapter. Each guide passageway is sized and shaped to receive a cleaning stick and to guide the cleaning stick to said one ferrule for cleaning said one ferrule.

Other objects and features of the present disclosure will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 14:
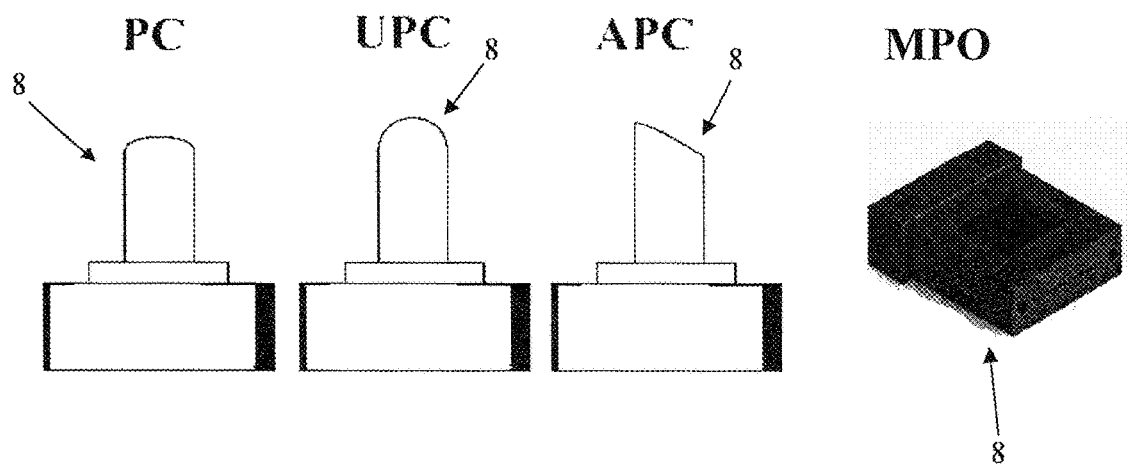
FIG. 14 illustrated exemplary ferrules that can be cleaned by the cleaning stick using a cleaning stick guide of the present disclosure.

Referring to FIGS. 3-10, a cleaning stick guide (e.g., cleaning guide) according to one embodiment of the present disclosure is generally indicated at reference numeral 20. The cleaning stick guide 20 is used to guide a cleaning stick 1 to a ferrule 8 for cleaning (e.g., blind cleaning) the ferrule to remove dirt, dust and other debris that may interfere with an optical connection formed by the ferrule. The cleaning stick guide 20 is configured to couple to an optical housing 14. The optical housing 14 includes (e.g., defines) a port 15 which receives the cleaning stick guide 20. Typically, the port 15 of the optical housing 14 is used to receive one or more optical connectors 10 for forming an optical connection with other optical connectors. The optical housing 14 has one or more ferrules 8 disposed therein. In the illustrated embodiment, the optical housing 14 is part of an optical adapter 12. The optical adapter 12 is configured to couple to two or more optical connectors 10 (broadly, one or more optical connectors) in order to form an optical connection between the optical connectors. Accordingly, in the illustrated embodiment, the ferrules 8 disposed in the optical housing 14 (e.g., adapter housing) of the optical adapter 12 are part of one or more optical connectors 10 coupled to the optical adapter 12. The optical adapter 12 is configured to couple to the one or more optical connectors 10 such that the one or more ferrules 8 of the optical connectors are disposed in the optical housing 14 when the optical connectors are coupled to the optical adapter. In other embodiments, the optical housing may be part of an optical connector, an optical transceiver, or another optical component containing an optical ferrule. Together, the cleaning stick guide 20 and optical adapter 12 form an optical adapter assembly. The cleaning stick guide 20 may be used with any suitable optical adapter, such as the optical adapters described in U.S. Pat. No. 10,281,668. In addition, the cleaning stick guide 20 may be used to guide the cleaning stick 1 for the cleaning of any suitable ferrule, such as a PC ferrule, a UPC ferrule, a APC ferrule, a MPO ferrule, etc. as shown in FIG. 14.

Figure 1:
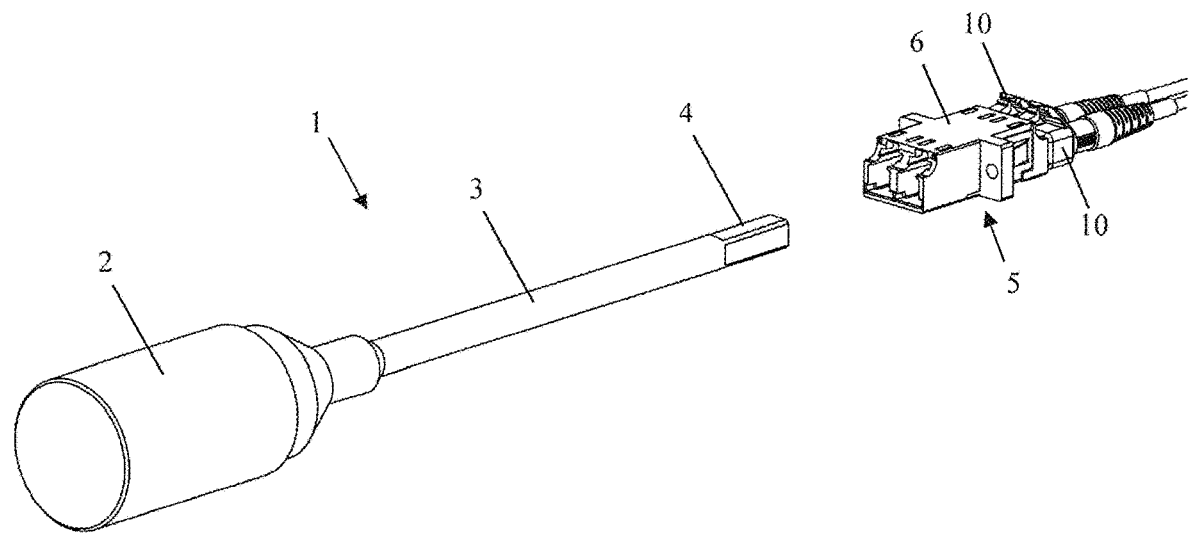
FIG. 1 is a perspective of a conventional cleaning stick and optical adapter, the optical adapter coupled to two optical connectors.
Figure 2:
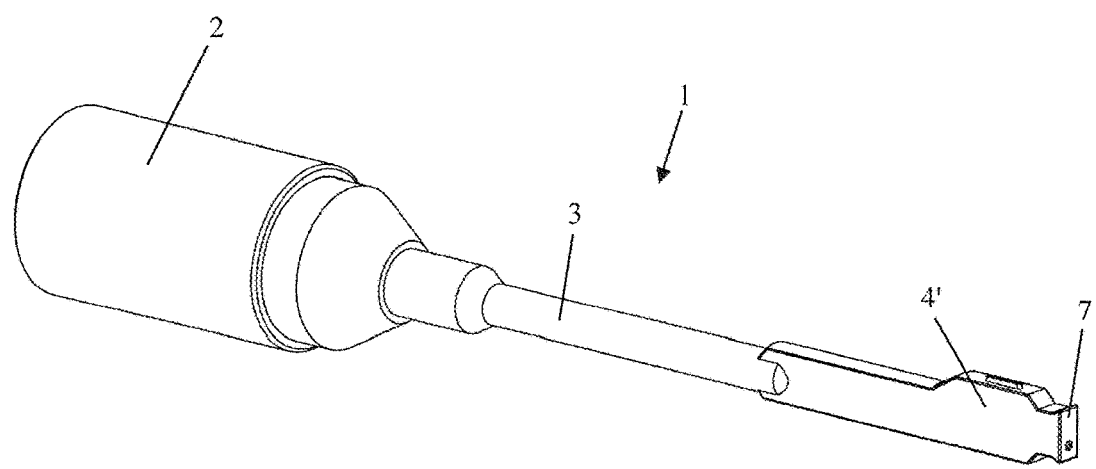
FIG. 2 is a perspective of another conventional cleaning stick.
Figure 3:
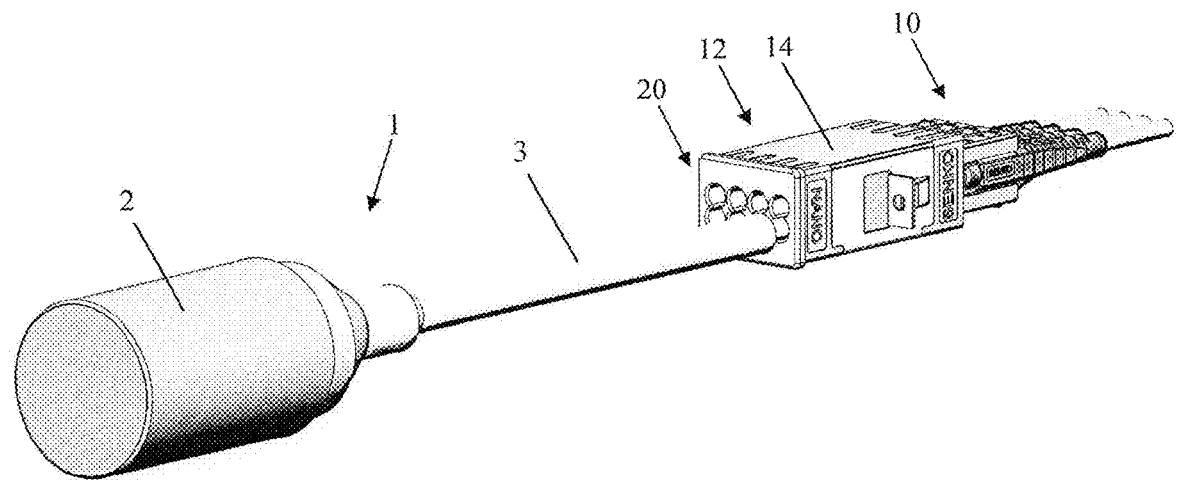
FIG. 3 is a perspective of a cleaning stick inserted into a cleaning stick guide according to one embodiment of the present disclosure; the cleaning stick guide coupled to an optical adapter.
Figure 4:
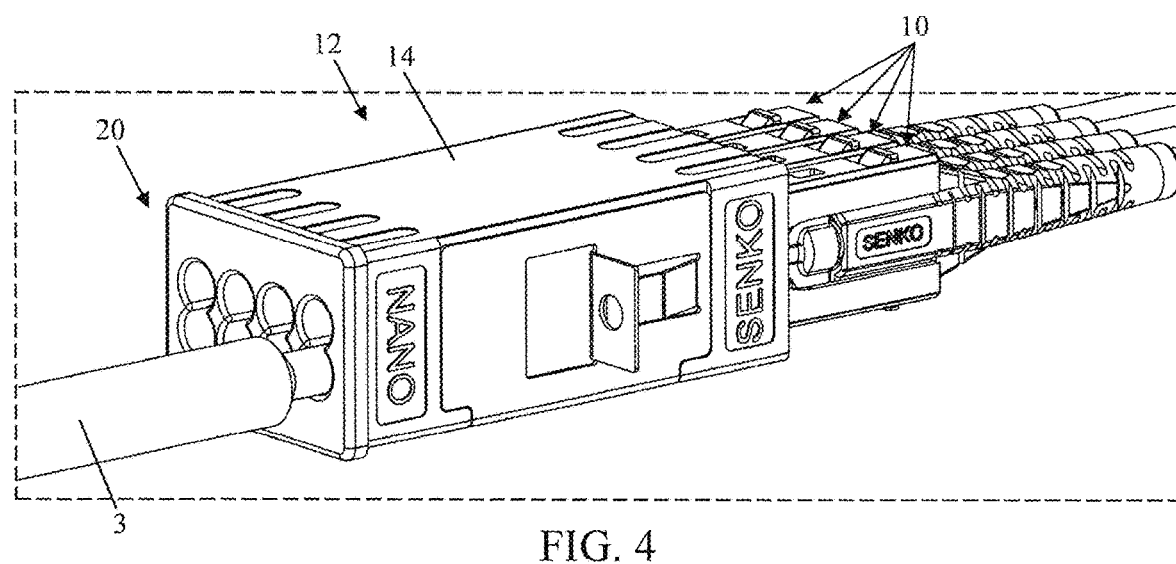
FIG. 4 is an enlarged perspective of FIG. 3.
Figure 5:
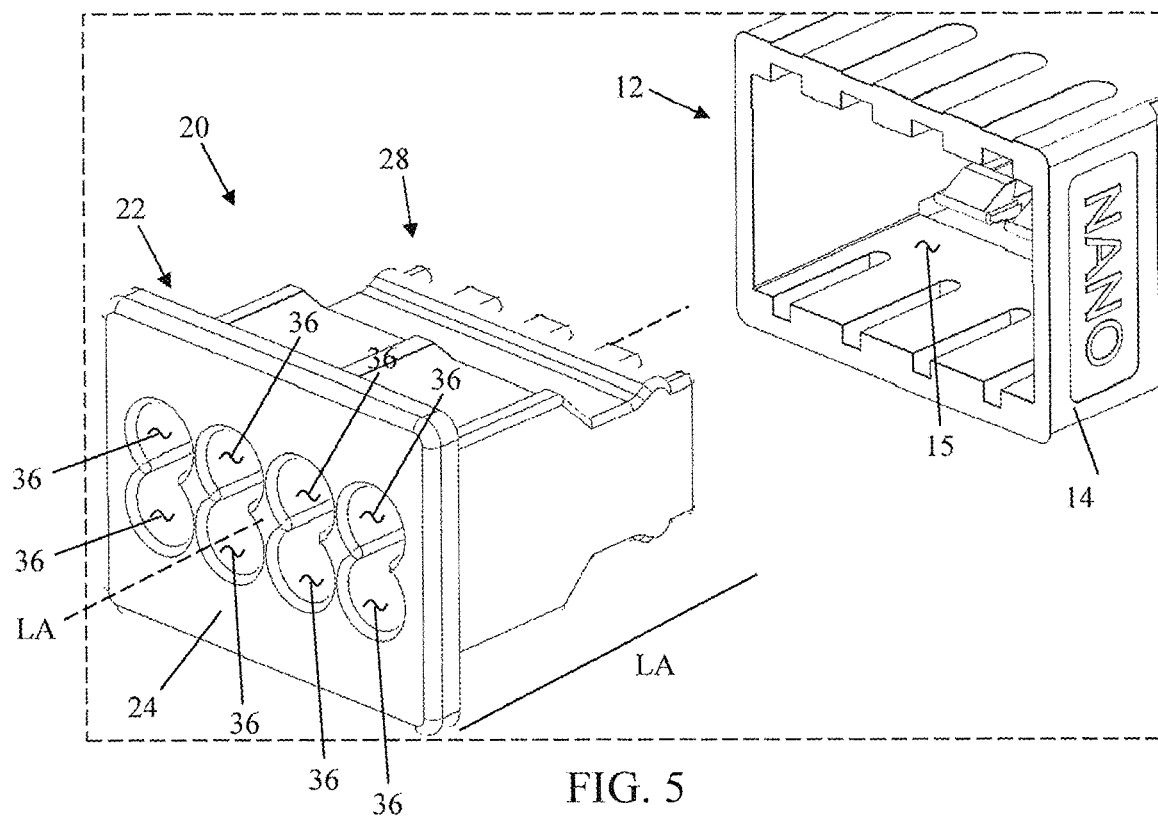
FIG. 5 is a front exploded view of the cleaning stick guide and the optical adapter.
Figure 6:
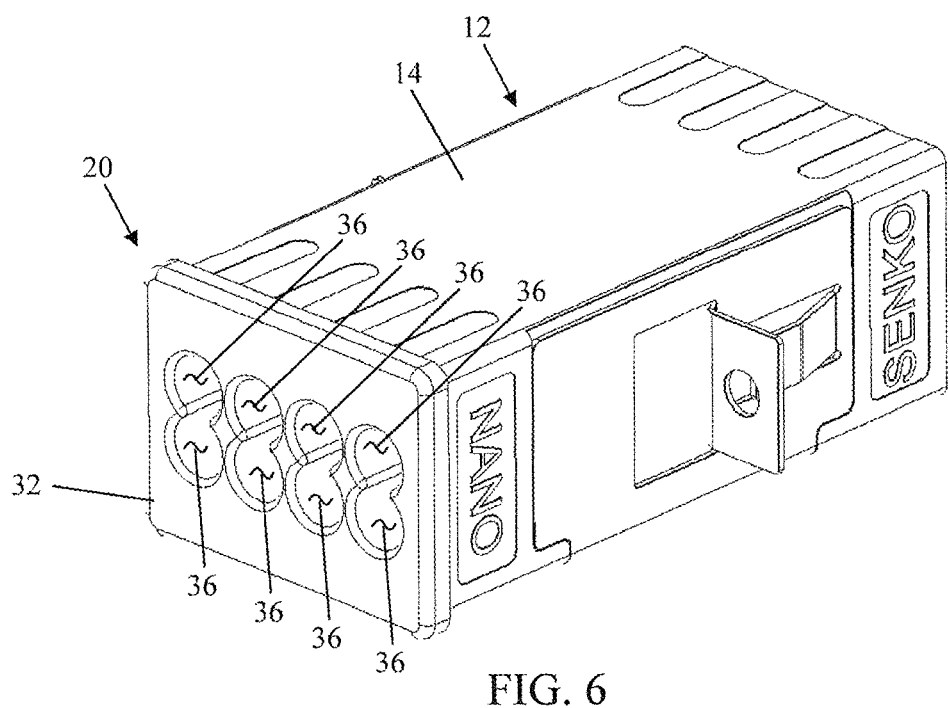
FIG. 6 is a perspective of the cleaning stick guide coupled to the optical adapter.
Figure 7:
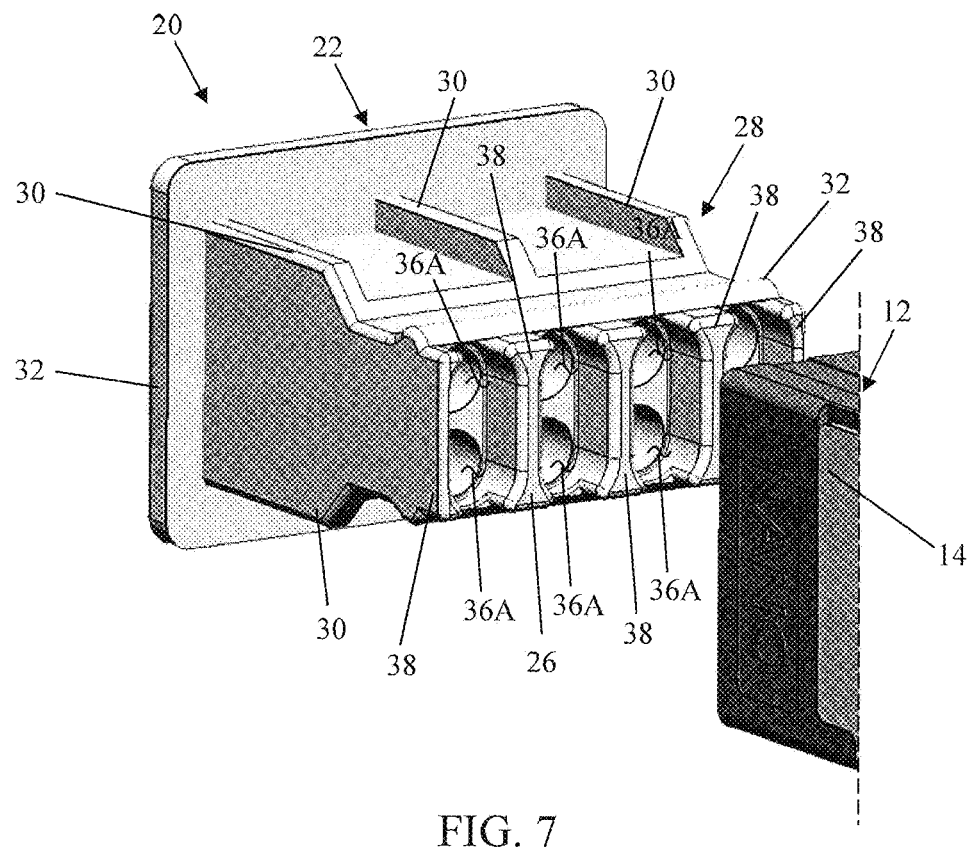
FIG. 7 is rear exploded view of the cleaning stick guide and the optical adapter.

Referring to FIGS. 5-7, the cleaning stick guide 20 includes a guide housing 22. The guide housing has a proximal end 24 and a distal end 26. A longitudinal axis LA extends between the proximal and distal ends 24, 26. The guide housing 22 is broadly configured to couple to the optical housing 14. In the illustrated embodiment, the guide housing 22 couples to the optical housing 14 by being inserted into the optical housing 14 (e.g., the port 15 thereof). However, other ways of coupling the guide housing to the optical housing may be used without departing from the scope of the disclosure.

The guide housing 22 includes an insert (e.g., distal) portion 28 sized and shaped to be inserted into the optical housing 14. Accordingly, the insert portion 28 generally conforms (e.g., corresponds) to the size and shape of the port 15 of the optical housing 14. In other embodiments, the insert portion 28 may generally conform to only a portion or section of the port 15, not the entire port as illustrated. The insert portion 28 can have different sizes and shapes to conform to different ports of different optical housings. The insert portion 28 defines (e.g., includes) the distal end 26 of the guide housing 22. When the insert portion 28 is disposed in the optical housing 14, the distal end 26 of the guide housing is disposed proximate or adjacent to the one or more ferrules 8 in the optical housing (see FIGS. 8-10). Thus, the length of the insert portion 28 corresponds to (e.g., matches or is slightly less than) the length (e.g., depth) of the port 15.

The insert portion 28 of the guide housing 22 may include one or more locators 30 (e.g., ribs, projections, etc.) configured to locate or position the insert portion relative to the optical housing 14. Each locator 30 is configured to engage the optical housing 14 and position the guide housing 22 relative to the optical housing when the insert portion 28 is inserted into (e.g., disposed in) the optical housing. In particular, each locator 30 engages an interior surface of the optical housing 14 that defines the port 15 to position the insert portion 28 within the port. In the illustrated embodiment, the insert portion 28 includes locators 30 on the upper and lower sides thereof. The insert portion 28 of the guide housing 22 may also include one or more detents or catches 32. The detents 32 are configured to be engaged by latches 17 (FIG. 9) to secure the guide housing 22 to the optical housing 14. In the illustrated embodiment, the latches 17 are part of the optical connectors 10. In other embodiments, the latches may be part of the optical housing 14. The latches 17 are resiliently deflectable to permit the guide housing 22 to be pushed into and pulled from the optical housing 14, with the application of a sufficient amount of force by an operator. In the illustrated embodiment, the guide housing 22 includes two detents 32, one on the upper side of the insert portion 28 and one on the lower side of the insert portion. The detents 32 are positioned adjacent the distal end 26 of the guide housing 22. Each detent 32 is generally elongate and extends along the width (e.g., entire width) of the insert portion 28. The guide housing 22 includes a stop 34 configured to engage the optical housing 14 and limit the distal movement of the guide housing relative to the optical housing when the guide housing is inserted into the optical housing. In the illustrated embodiment, the stop 34 is a flange (e.g., peripheral flange) that engages a proximal end of the optical housing 14.

The guide housing 22 includes one or more (e.g., a plurality of) guide passageways 36. Each guide passageway 36 is configured to guide the cleaning stick 1 to one of the ferrules 8 disposed in the optical housing 14 for cleaning the ferrule (e.g., end face thereof). In the illustrated embodiment, the guide housing 22 has eight guide passageways 36, although more or fewer guide passageways are within the scope of the present disclosure. One guide passageway 36 will now be described in further detail with the understanding the other guide passageways have essentially the same construction (e.g., the guide passageways are generally identical). The guide passageway 36 is arranged or disposed in the guide housing 22 to align with one of the ferrules 8 in the optical housing 14 when the guide hosing is inserted into (e.g., disposed in) the optical housing. Accordingly, when the cleaning stick guide 20 is attached to the optical housing 14, the guide passageway 36 is aligned (e.g., longitudinally aligned) with one of the ferrules 8. The guide passageway 36 extends from the proximal end 24 of the guide housing 22 to the distal end 26 of the guide housing. The guide passageway 36 is generally parallel to the longitudinal axis LA. The guide passageway 36 is sized and shaped to receive a cleaning stick 1 (e.g., the cleaning tip 4") and to guide the cleaning stick to said one ferrule 8 for cleaning the ferrule.

In the illustrated embodiment, the guide passageway 36 has a generally circular cross-sectional shape. The cleaning tip 4" of the cleaning stick 1 has a corresponding cross-sectional shape. Accordingly, the cleaning tip 4" of the cleaning stick also has a generally circular cross-sectional shape. The cleaning tip 4" of the cleaning stick 1 is inserted through the guide passageway 36 to access the ferrule 8. The guide passageway 36 has an open proximal end and an open distal end to permit the cleaning stick 1 to extend into and out of the guide passageway. The guide passageway 36 includes a distal portion 36A (e.g., a ferrule recess) sized and shaped to receive a free end portion of the ferrule 8 (FIGS. 7-10). In some embodiments, the ferrule recess 36A may be considered separate from the guide passageway 36 and disposed at the distal end of the guide passageway. In the illustrated embodiment, the guide passageway 36 also includes a larger proximal section 36C and a narrow section 36B. The proximal end portion of the proximal section 36C is chamfered to make it easier to insert the tip of the cleaning device into the guide passageway 36. The narrow section 36B is disposed and extends between the proximal section 36C and the ferrule recess 36A. The narrow section 36B is disposed toward the distal end 26 of the guide housing 36. The narrow section 36B directs and focuses the cleaning stick 1 directly toward the ferrule 8. Other configurations of the guide passageway 36 is within the scope of the present disclosure.

Still referring to FIGS. 5-7, the guide passageways 36 of the cleaning stick guide 20 are arranged in a group to correspond to the group of ferrules 8 in the optical housing 14. In the illustrated embodiment, the guide passageways 36 are arranged in pairs in a 2×4 grid. The two guide passageways 36 (and the two corresponding ferrule recess 36A) of each pair are connected together, due to the arrangement (e.g., close proximity) of the ferrules 8 the two guide passageways 36 are configured to align with. In other embodiments, the guide passageways 36 may be spaced apart. As shown in FIG. 7, the ferrule recess 36A are defined by ribs 38 of the guide housing 22. The ribs 38 generally inhibit the ferrules 8 from moving (e.g., side to side movement) while the ferrules are being engaged and cleaned by the cleaning stick 1.

Figure 8:
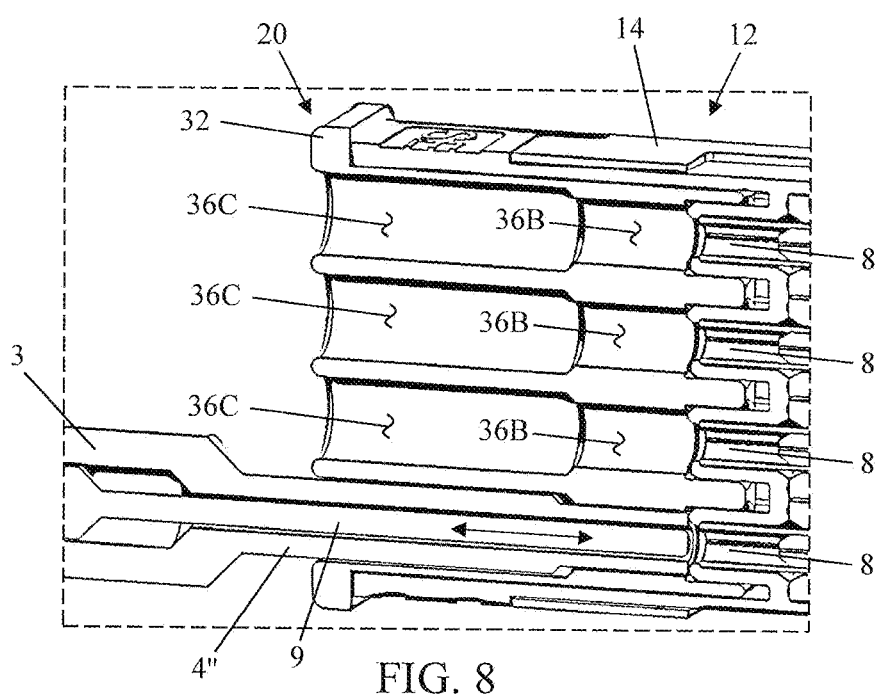
FIG. 8 is generally horizontal cross-section perspective of the cleaning stick disposed in the cleaning stick guide for cleaning a ferrule in the optical adapter.
Figure 9:
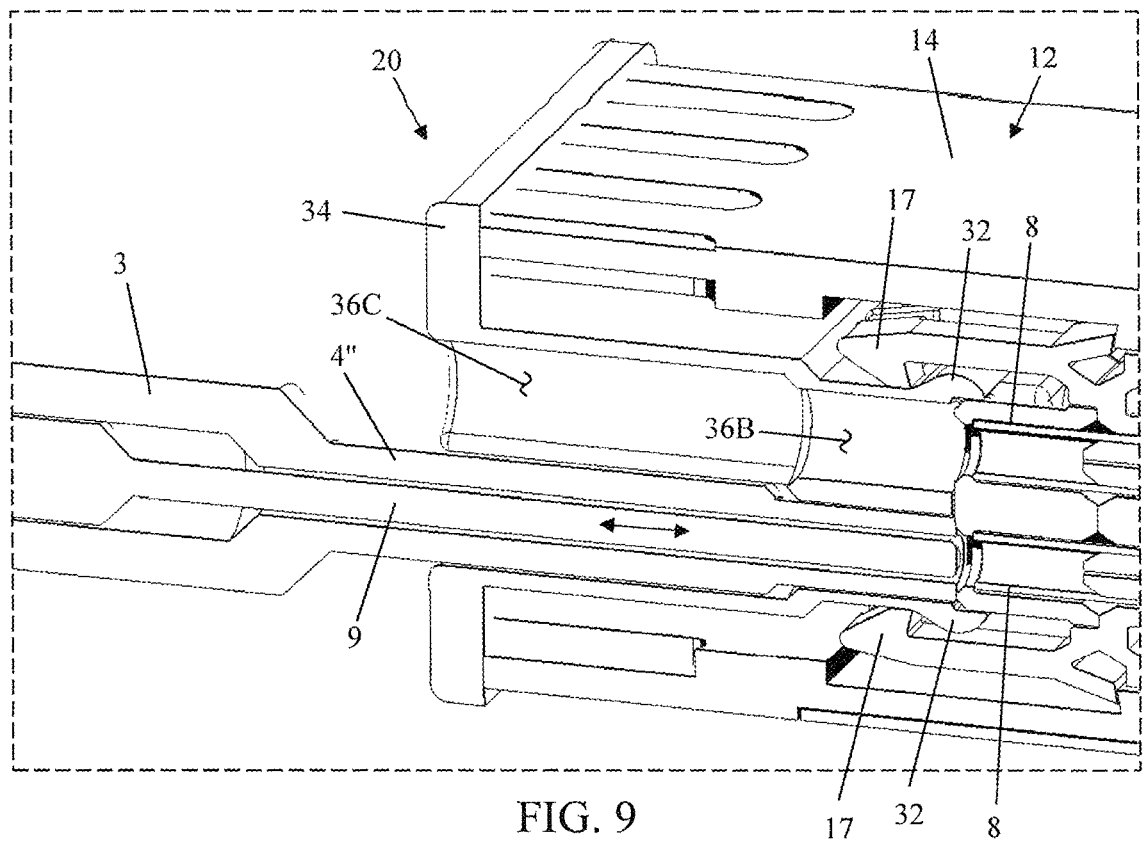
FIG. 9 is a generally vertical cross-section perspective of the cleaning stick disposed in the cleaning stick guide for cleaning a lower ferrule in the optical adapter.
Figure 10:
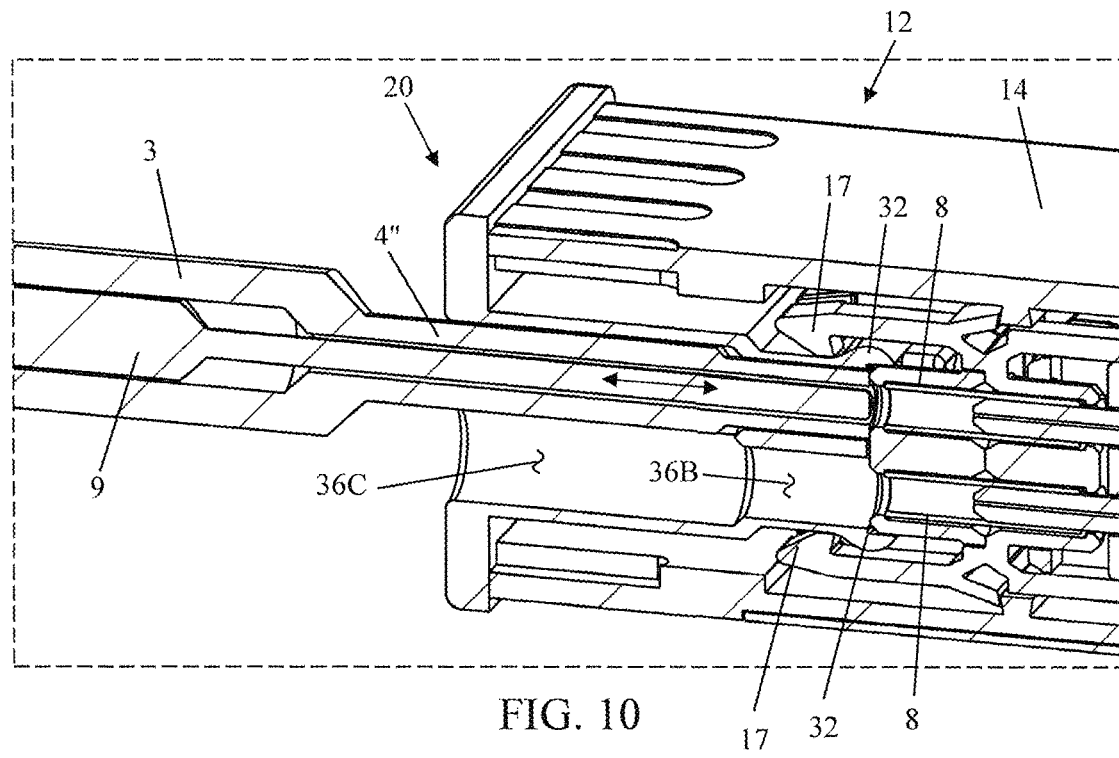
FIG. 10 is a generally vertical cross-section perspective of the cleaning stick disposed in the cleaning stick guide for cleaning an upper ferrule in the optical adapter.

Referring to FIGS. 8-10, to use the cleaning stick guide 20 to clean the ferrules 8, the cleaning stick guide is inserted into the port 15 of the optical housing 14. If the optical housing 14 is part of an optical adapter 12, as illustrated, then one or more optical connectors 10 may need to be removed from the port 15 in order to insert the cleaning stick guide 20 into the port. Once inserted into the port 15, the guide passageways 36 are aligned with the ferrules 8. The latches 17 engage the detents 32 to secure the cleaning stick guide 20 to the optical housing 14. With the cleaning stick guide 20 coupled to the optical housing 14, an operator can take the cleaning stick 1 and insert the cleaning tip 4" of the cleaning stick distally into each guide passageway 36 to clean the ferrule 8 aligned with each guide passageway. Each guide passageway 36 directs the cleaning tip 4" directly to the ferrule 8, ensuring the cleaning tip cleans the ferrule even though the operator cannot see the ferrule (e.g., blind cleaning). With conventional cleaning tips 4, 4' that are inserted directly into the port 15 of the optical housing 14, there is no way to determine if the ferrule 8 was cleaned because it was not possible to ensure the cleaning face 7 engages and cleans the ferrule. However, the cleaning stick guide 20 of the present disclosure specifically guides the cleaning tip 4" to the ferrule 8, ensuring the ferrule is cleaned. Once the cleaning tip 4" is at the ferrule 8, the plunger 9 of the cleaning stick 1 may be moved proximally and distally to clean the ferrule. After one ferrule 8 is cleaned, the cleaning stick 1 is moved to the next guide passageway 36 to clean the next ferrule. Once all the ferrules 8 are cleaned, the cleaning stick guide 20 is removed from the optical housing 14 and the optical connectors 10 are reconnected in the port 15. If desired, the optical connectors 10 on the other side of the optical housing 14 (e.g., connected to the other side of the optical adapter 12) can be removed so that the process can be repeated to clean the ferrules 8 of the optical connectors just reconnected to the optical housing.

The cleaning stick guide 20 of the present disclosure permits the same (e.g., universal) cleaning stick 1 to be used to clean ferrules 8 in different types of optical housings 6, 14, unlike conventional clean sticks which had to have cleaning tips 4,4' designed specifically for one type of housing. The cleaning stick guide 20 of the present disclosure can have a variety of different configurations for use with different types of optical housings 6, 14. However, each configuration of the cleaning stick guide 20 for each type of optical housing 6, 14 can receive and guide the same cleaning stick 1. Accordingly, instead of having multiple different types of cleaning sticks 1, now a single cleaning stick can be used with different types of optical housings 6, 14.

Figure 11:
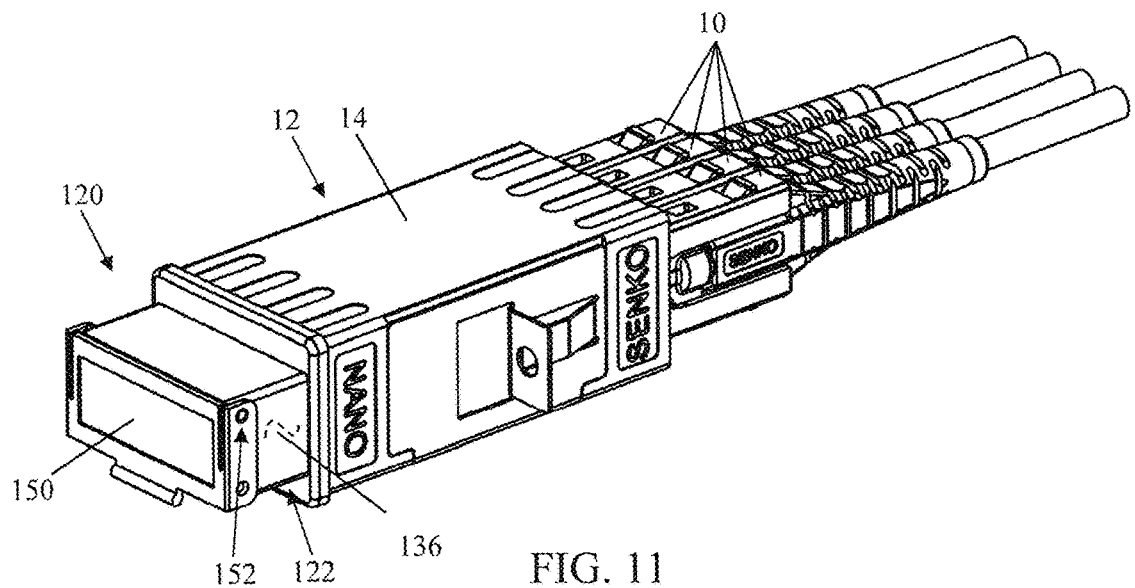
FIG. 11 is a perspective of a cleaning stick guide according to another embodiment of the present disclosure attached to the optical adapter.
Figure 12:
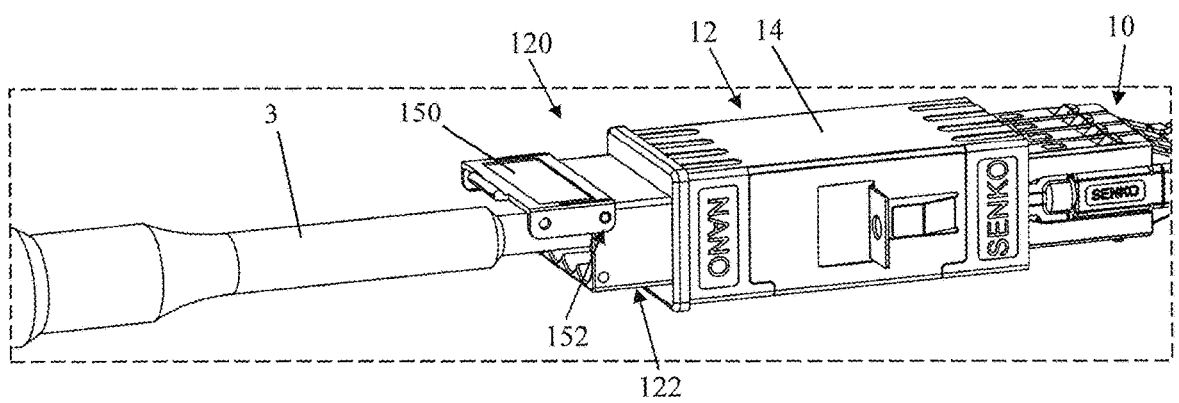
FIG. 12 is a perspective of the cleaning stick inserted into the cleaning stick guide of FIG. 14.

Referring to FIGS. 11 and 12, another embodiment of a cleaning stick guide according to the present disclosure is generally indicated by reference numeral 120. Cleaning stick guide 120 is generally analogous to cleaning stick guide 20 and, thus, for ease of comprehension, where similar, analogous or identical parts are used, reference numerals "100" units higher are employed. Accordingly, unless clearly stated or indicated otherwise, the above descriptions regarding cleaning stick guide 20 also apply to cleaning stick guide 120.

In this embodiment, the cleaning stick guide 120 includes a dust cover 150. The dust cover 150 is movable (relative to the guide housing 122) between a closed position (FIG. 11) and an open position (FIG. 12). In the closed position, the dust cover 150 covers (e.g., blocks) the guide passageways 136 (formed within guide housing 122, depicted by broken line) to inhibit dirt, dust and other debris from entering the guide passageways and potentially interfering with an optical connection formed by a ferrule 8. In the open position, the dust cover 150 permits access to the guide passageways 136. The dust cover 150 is operatively connected to the guide housing 122. In particular, the cleaning stick guide 120 includes a hinge 152 (e.g., a rod) coupling the dust cover 150 to the guide housing 122, although other ways of coupling the dust cover to the guide housing are within the scope of the present disclosure. In addition, in this embodiment the guide housing 122 is more elongate than guide housing 22.

Figure 13:
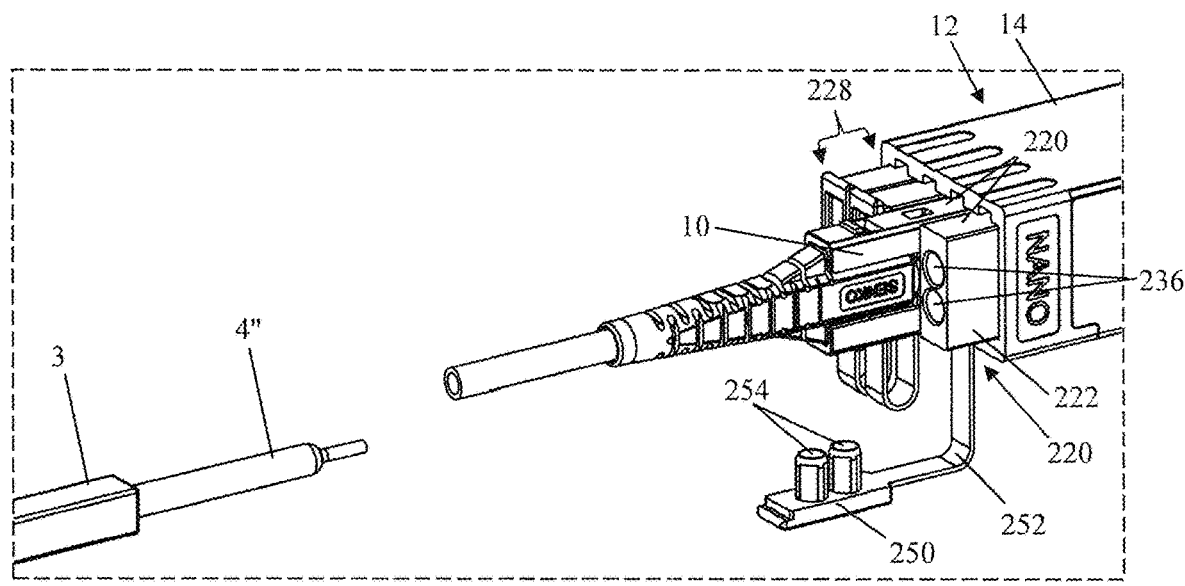
FIG. 13 is a perspective of the cleaning stick inserted into a cleaning stick guide according to another embodiment of the present disclosure; the cleaning stick guide coupled to an optical adapter.

Referring to FIG. 13, another embodiment of a cleaning stick guide according to the present disclosure is generally indicated by reference numeral 220. Cleaning stick guide 220 is generally analogous to cleaning stick guide 120 and, thus, for ease of comprehension, where similar, analogous or identical parts are used, reference numerals "100" units higher are employed. Accordingly, unless clearly stated or indicated otherwise, the above descriptions regarding cleaning stick guide 120 (and by extension cleaning stick guide 20) also apply to cleaning stick guide 220.

In this embodiment, the dust cover 250 of the cleaning stick guide 220 is coupled to the guide housing 222 with a living hinge strap 252. In addition, the dust cover 250 includes one or more projections, protrusions or caps 254.

Each cap 254 is sized and shaped to extend into (e.g., to be disposed in) a corresponding guide passageway 236 when the dust cover 250 is in the closed position, to hold the dust cover in the closed position. Accordingly, each cap 254 has a cross-sectional shape that corresponds to the cross-sectional shape of the guide passageway 236. In addition, in this embodiment the cleaning stick guide 220 is configured to only be inserted into a portion of the port 15 of the optical housing 14. The insert portion 228 generally conforms to only a portion of the port 15. In the illustrated embodiment, the cleaning stick guide 220 includes two guide passageways 236 which align with the two ferrules 8 associated with the portion of the port 15 the cleaning stick guide 220 is inserted into (e.g., disposed in). Accordingly, in this embodiment, the port 15 of the optical housing 14 may receive several cleaning stick guides 220 at the same time. For example, in the illustrated embodiment, three cleaning stick guides 220 and one optical connector 10 are disposed in the port 15. Other combinations of cleaning stick guides 220 and/or optical connectors 10 in the port 15 are within the scope of the present disclosure.

Modifications and variations of the disclosed embodiments are possible without departing from the scope of the invention defined in the appended claims. For example, where specific dimensions are given, it will be understood that they are exemplary only and other dimensions are possible.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A cleaning stick guide for an optical housing having one or more ferrules therein, the cleaning stick guide comprising:
    a guide housing configured to couple to the optical housing, the guide housing having a proximal end and a distal end, the guide housing including one or more guide passageways, each guide passageway extending from the proximal end through the distal end, each guide passageway configured to align with one ferrule of the one or more ferrules in the optical housing when the guide housing is coupled to the optical housing, each guide passageway being sized and shaped to receive a cleaning stick and to guide the cleaning stick to said one ferrule for cleaning said one ferrule, and
    a dust cover coupled to the guide housing and moveable relative to the guide housing between a closed position and an open position, wherein in the closed position the dust cover blocks the one or more guide passageways and wherein in the open position the dust cover permits access to the one or more guide passageways,
    wherein the dust cover includes one or more protrusions, and each protrusion has a cross-sectional shape that corresponds to the cross-sectional shape of the guide passageway.

2. The cleaning stick guide of claim 1, wherein the one or more guide passageways comprises a plurality of guide passageways.

3. The cleaning stick guide of claim 1, wherein each guide passageway has a narrow section toward the distal end of the guide housing.

4. The cleaning stick guide of claim 1, wherein the dust cover is operatively connected to the guide housing.

5. The cleaning stick guide of claim 4, further comprising a hinge coupling the dust cover to the guide housing.

6. The cleaning stick guide of claim 1, wherein the guide housing includes an insert portion sized and shaped to be inserted into the optical housing, the insert portion defining the distal end of the guide housing.

7. The cleaning stick guide of claim 1, wherein the guide housing includes one or more locators configured to engage the optical housing and position the guide housing relative to the optical housing when the insert portion is inserted into the optical housing.

8. The cleaning stick guide of claim 1, wherein each guide passageway has a proximal end portion and a distal end, and the proximal end portion of the guide passageway is chamfered.

9. The cleaning stick guide of claim 1, wherein the dust cover is coupled to the guide housing with a hinge strap.

10. An optical adapter assembly for connecting to one or more optical connectors, each optical connector having one or more ferrules, the optical adapter assembly comprising:
    an optical adapter having an adapter housing defining a port, the optical adapter configured to couple to the one or more optical connectors such that the one or more ferrules are disposed in the adapter housing when the one or more optical connectors are coupled to the optical adapter;
    a cleaning stick guide including a guide housing having a proximal end and a distal end, the guide housing sized and shaped to be coupled to the port of the optical adapter, the cleaning stick guide housing including one or more guide passageways, each guide passageway extending from the proximal end to the distal end, each guide passageway configured to align with one ferrule of the one or more ferrules of the one or more optical connectors when the cleaning stick guide is disposed in the port of the optical adapter and the one or more optical connectors are coupled to the optical adapter, each guide passageway sized and shaped to receive a cleaning stick and to guide the cleaning stick to said one ferrule for cleaning said one ferrule; and a dust cover coupled to the guide housing and moveable relative to the guide housing between a closed position and an open position, wherein in the closed position the dust cover blocks the one or more guide passageways and wherein in the open position the dust cover permits access to the one or more guide passageways, wherein the dust cover includes one or more protrusions, and each protrusion has a cross-sectional shape that corresponds to the cross-sectional shape of the guide passageway.

11. The optical adapter assembly of claim 10, wherein the one or more guide passageways comprises a plurality of guide passageways.

12. The optical adapter assembly of claim 10, wherein each guide passageway has a narrow section toward the distal end of the cleaning stick guide.

13. The optical adapter assembly of claim 10, wherein the dust cover is operatively connected to the guide housing.

14. The optical adapter assembly of claim 13, further comprising a hinge coupling the dust cover to the cleaning stick guide.

15. The optical adapter assembly of claim 10, wherein the cleaning stick guide includes one or more locators configured to engage the optical housing and position the cleaning stick guide relative to the optical housing when the cleaning stick guide is disposed in the port of the optical adapter.

16. The optical adapter assembly of claim 10, wherein the dust cover is coupled to the guide housing with a hinge strap.

* * * * *